United States Patent [19]

Petrak et al.

[11] Patent Number: 5,324,694
[45] Date of Patent: Jun. 28, 1994

[54] SILICON NITRIDE/BORON NITRIDE COMPOSITE WITH ENHANCED FRACTURE TOUGHNESS

[75] Inventors: Daniel R. Petrak; Jae D. Lee, both of Lynchburg, Va.

[73] Assignee: The Babcock & Wilcox Company, New Orleans, La.

[21] Appl. No.: 749,150

[22] Filed: Jun. 26, 1985

[51] Int. Cl.$^5$ .................................. C04B 35/58
[52] U.S. Cl. ............................ 501/97; 264/65; 264/66
[58] Field of Search ............... 501/97, 98; 264/65, 264/66; 428/446, 698

[56] References Cited

U.S. PATENT DOCUMENTS

| | | | |
|---|---|---|---|
| 3,813,252 | 5/1974 | Lipp | 501/97 |
| 3,833,389 | 9/1974 | Komeya et al. | 501/98 |
| 4,284,432 | 8/1981 | Nishida et al. | 501/98 |
| 4,322,249 | 3/1982 | Claussen et al. | 501/88 |
| 4,407,971 | 10/1983 | Komatsu et al. | 501/97 |
| 4,412,009 | 10/1983 | Komatsu et al. | 501/97 |
| 4,440,707 | 4/1984 | Shimamori et al. | 264/65 |
| 4,542,072 | 9/1985 | Hsieh | 428/446 |
| 4,578,087 | 3/1986 | Tanaka et al. | 51/295 |

FOREIGN PATENT DOCUMENTS

| | | | |
|---|---|---|---|
| 3141590 | 6/1982 | Fed. Rep. of Germany | 264/66 |
| 53-30612 | 3/1978 | Japan | 501/97 |
| 57-188466 | 11/1982 | Japan | 501/97 |
| 57-188468 | 11/1982 | Japan | 501/97 |
| 58-55375 | 4/1983 | Japan | 501/98 |
| 58-84184 | 5/1983 | Japan | 501/97 |
| 2031466 | 4/1980 | United Kingdom | 501/97 |

*Primary Examiner*—Donald P. Walsh
*Assistant Examiner*—Daniel Jenkins
*Attorney, Agent, or Firm*—Vytas R. Matas; Daniel S. Kalka; Robert J. Edwards

[57] ABSTRACT

The invention relates to silicon nitride composite articles having improved fracture toughness prepared by forming a composition including small amounts of boron nitride powder in a silicon nitride powder base and processing the composition.

6 Claims, 2 Drawing Sheets

SILICON NITRIDE/BORON NITRIDE COMPOSITE WITH ENHANCED FRACTURE TOUGHNESS

BACKGROUND OF THE INVENTION

This invention relates to silicon nitride based material and, more particularly, to silicon nitride/boron nitride composites that have enhanced fracture toughness and high-strength.

Silicon nitride has been identified as a potential candidate for high-temperature structural applications, such as heat engines. Boron nitride additions to silicon nitride have been shown to enhance several properties of silicon nitride. Specifically, high levels of boron nitride additions (10 percent or greater) can enhance such properties as machinability without diamond tooling, thermal shock resistance and the specification of dielectric properties. Although silicon nitride typically exhibits better fracture toughness than many other monolithic ceramics, such as silicon carbide and aluminum oxides, means for further enhancing the inherent fracture toughness of silicon nitride have not previously been developed. It is known, however, that some properties of monolithic ceramics have been improved by incorporating a second phase dispersion, for example, fine monoclinic $ZrO_2$, BN and Mo particles in $Al_2O_3$ or SiC particles in $Si_3N_4$.

These aspects of the prior art are discussed in more detail in U.S. Pat. No. 3,813,252 to Leubas, U.S. Pat. No. 3,833,389 to Komeya et al and K. S. Maziyazni and R. Ruh, "High/Low Modulus $Si_3N_4$-BN Composite for Improved Electrical and Thermal Shock Behavior," *J. Am. Ceram. Soc.*, 64, 415–419 (1981).

However, while the previously described $Si_3N_4$/BN composites prepared by hot pressing techniques appeared to have good thermal shock resistance, the composites demonstrated inconsistent densities and the relative theoretical densities of the composites were found to decrease with increasing boron nitride content. Consequently, the room temperature strengths were significantly lower for compositions with BN additions. The hot-pressed composites were also visually unattractive i.e., were found to have varying shades of grayish-white to tan color.

SUMMARY OF THE INVENTION

Accordingly, it is an object of the invention to provide an improved silicon nitride/boron nitride composite, including a particular range of boron nitride, which are characterized by increased fracture toughness and high strength, and which have been processed so as to avoid the cosmetic problems experienced in the past.

Compositions for use in forming composites having the properties of the invention are produced by preparing a powder mixture consisting essentially of silicon nitride and 2.5 to 5.0%, by weight, of boron nitride, adding densification aids of yttrium oxide ($Y_2O_3$) and alumina ($Al_2O_3$), and air firing the mixture at 550° C. The compositions are then hot-pressed at 1720° C., for 2 hours.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION

The enhanced fracture toughness composites of the invention are produced from a powdered, relatively homogenous, composition consisting essentially of a mixture of powders of silicon nitride and 2.5 to 5.0%, by weight, of boron nitride. Average particle size of both components, the silicon nitride and boron nitride, are less than 1 micron. Densiftcation aids comprising 5% yttrium oxide and 2% alumina, by weight, are added to the silicon nitride/boron nitride mixture.

The powdered mixture, including the densification aids, are air-fired at 550° C. for 3 hours prior to hot pressing. This step has been found to eliminate the coloration problems which otherwise occur. These unacceptable cosmetic defects, as a result, are believed to be related to residual traces of carbon that may be present in the silicon nitride powder. The air-firing does not affect densification and strength of the hot pressed composite.

Compositions studied by the inventors included silicon nitride with 0, 2.5, 5.0, 10, 15, 20 and 30 weight percent boron nitride. Each composition contained 5% $Y_2O_3$ and 2% $Al_2O_3$. The compositions were prepared by wet balling in methanol, drying, dry ball milling, and screening through a 35 mesh (Tyler mesh screen). The powder mixtures were air-fired at 550° C. for 3 hours in $Al_2O_3$ crucibles.

Figure 1:
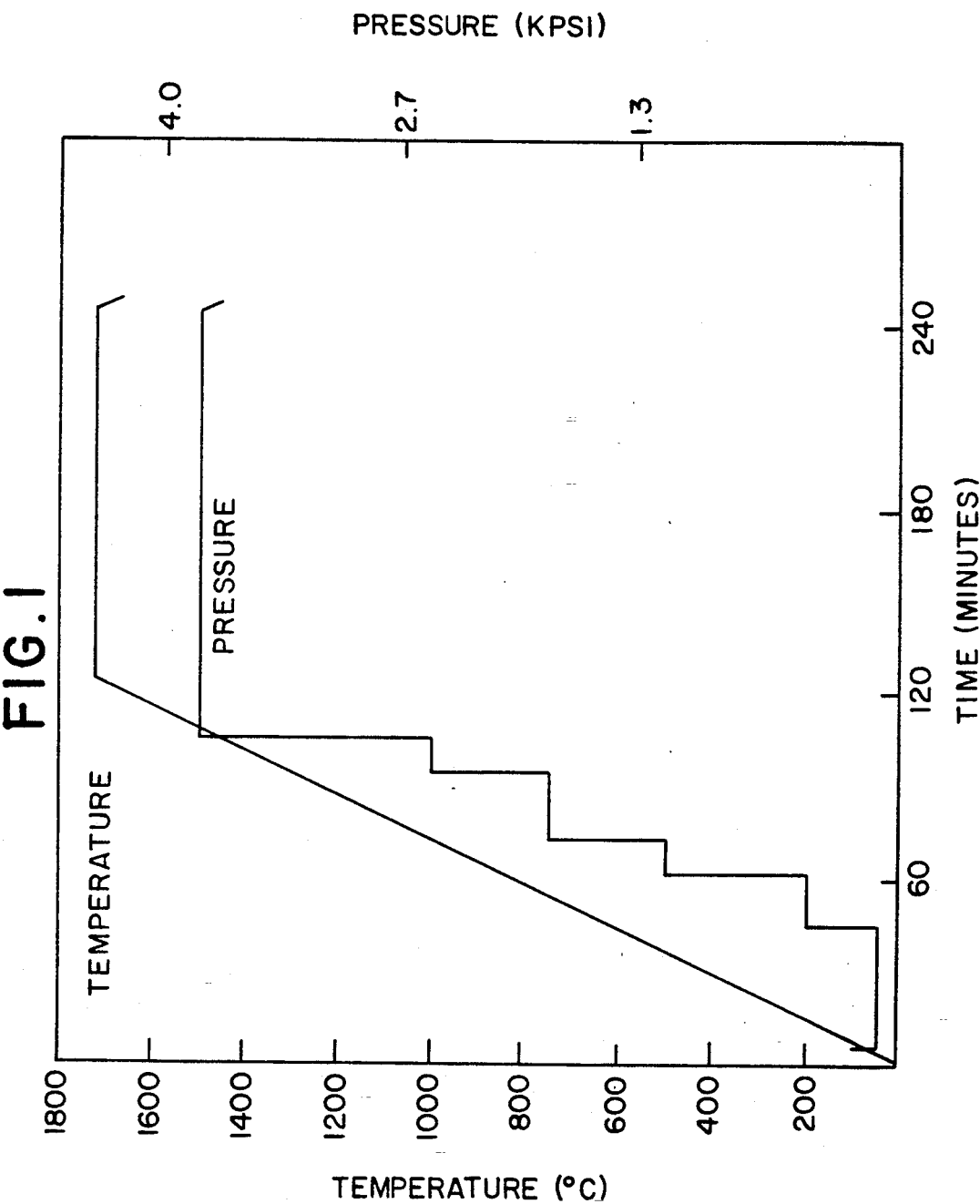
FIG. 1 is a graphic illustration of the hot pressing schedule used to prepare composites of the invention.

Composite billets were formed by uniaxially hot-pressing the compositions for two hours in graphite dies under a nitrogen atmosphere. FIG. 1 graphically illustrates the hot pressure schedule employed.

Fracture toughness, $K_{IC}$, was measured by three different methods: single edge notch beam (SENB), chevron notch beam (CNB), and indentation fracture toughness (IFT). The SENB specimens were $0.20 \times 0.20 \times 2.50$ in., notched approximately ⅓ of their height with a notch width of 0.020 in., and were tested on a 1.5 in. span in a 3-point fixture. CNB specimens were identical to SENB except for the Chevron notch pattern. IFT were determined from the crack pattern of a Vicker indentation at 10 kg load on the sample surfaces polished through 3 um diamond. Values for $K_{IC}$ were also calculated from work of fracture and Young's modulus. No notch width correction was made.

Figure 2:
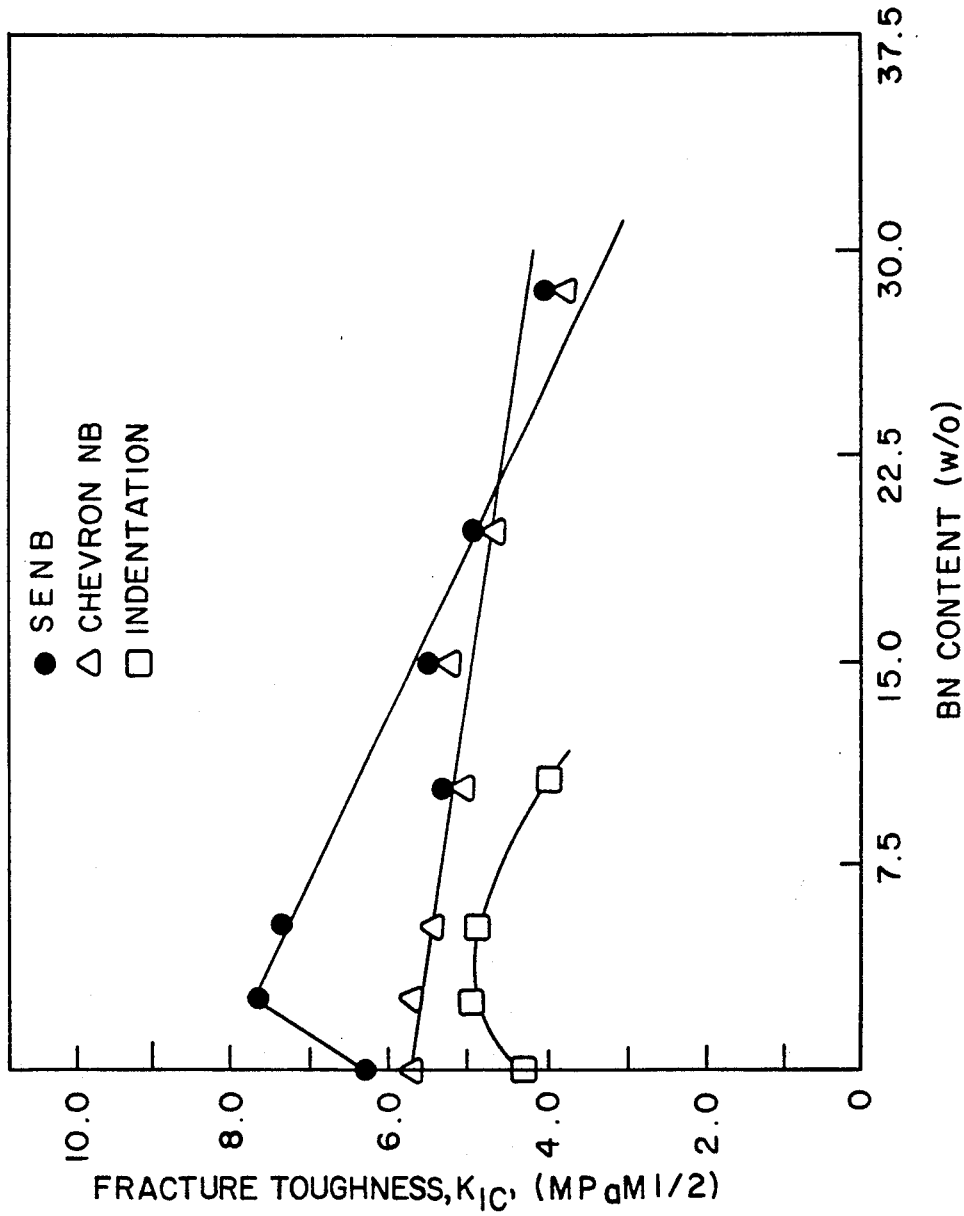
FIG. 2 is a graphic illustration of fracture toughness of composites of the invention as a function of boron nitride content.

The results are given in Table I and presented in FIG. 2. In the SENB and IFT methods the fracture toughness of $Si_3N_4$ with 2 5 to 5.0 weight percent BN content showed a higher value than that of $Si_3N_4$ without BN, although room temperature flexural strength remained comparable to $Si_3N_4$ without BN additions. The CNB data did not show this relationship but the reason for this apparent discrepancy is unknown. Above 4% BN the toughness slowly decreased as BN content increased. Anisotropy of $K_{IC}$ related to hot press direction was expected from the microstructure of BN particles which are flake shaped.

TABLE I

FRACTURE TOUGHNESS, WORK OF FRACTURE AND FLEXURAL STRENGTH OF $Si_3N_4$/BN COMPOSITES

| BN Content (w/o) | W.O.F. (J/M²) | $K_{IC}$[2] (MPaM½) | $K_{IC}$[3] (MPaM½) | | $K_{IC}$[4] (MPaM½) | Flexural[6] Strength ($K_{psi}$) |
|---|---|---|---|---|---|---|
| 0.0 | 6.4 | 145.5 | 8.76 | 4.29 3.69 | 5.65 | 106/1.6 |
| 2.5 | 7.62 | 202.0 | 9.90 | 4.99 3.83 | 5.64 | 104/12.5 |
| 5.0 | 7.33 | 198.5 | 9.57 | 4.87 4.02 | 5.36 | 96/12.8 |
| 10.0 | 5.14 | 115.6 | 6.78 | 3.87 3.57 | 5.01 | 85/0.3 |
| 15.0 | 5.30 | 134.6 | 6.82 | ND[5] | 5.11 | 70/3.2 |
| 20.0 | 4.80 | 129.4 | 6.30 | ND | 4.54 | 59/2.7 |
| 30.0 | 3.60 | 118.8 | 5.09 | ND | 3.52 | 42/5.3 |

[1]Single edge notch beam fracture toughness (crack plane and direction // HP direction) (Notch width = 0.020 inches)
[2]Fracture toughness calculated from work of fracture and the value of Young's Modulus (taken from FIG. 1). (Crack plane and direction, parallel to hot-pressing direction)
[3]Indentation toughness (Vicker indentation at 10 kg load), left column taken parallel to hot-pressing direction and right column taken perpendicular to the hot-pressing direction
[4]Chevron notch beam test
[5]Not determined
[6]3-point bend strength (avg. value/standard deviation)

A definite increase in fracture toughness of the silicon nitride is indicated in the range of 2.5 to 5.0 weight percent of boron nitride and the data suggests that this increase can be expected in the broader range of 1.0 to 10.0 percent, by weight, of boron nitride.

Thus, in accordance with the invention, an improved silicon nitride composition for forming a composite of high fracture toughness is composed of a mixture, on a weight basis, of 95% to 97.5% of silicon nitride, 2.5% to 5.0% of boron nitride, and approximately 7.0% by weight of a densification aid, the densification aid being 5% yttrium oxide and 2% alumina.

While a specific embodiment of the invention has been shown and described in detail to illustrate the application of the principles of the invention, it will be understood that the invention may be embodied otherwise without departing from such principles.

The embodiments of the invention in which an exclusive property or privilege is claimed are defined as follows:

1. An improved silicon nitride composition suitable for forming a composite of high fracture toughness without discoloration consisting essentially of a homogeneous powder mixture on a weight basis of 95% to 97.5% of silicon nitride and 2.5% to 5.0% of boron nitride.

2. An improved composition as set forth in claim 1 further comprising a densification aid containing, by weight of the composition, 5% yttrium oxide and 2% alumina.

3. A method of processing a silicon nitride composition to form a composite of high fracture toughness without discoloration of the type in which the composition is hot-pressed, the improvement comprising forming the composition by mixing, on a weight basis, 95% to 97.5% silicon nitride powder and 2.5% to 5.0% boron nitride powder air firing the composition powder at a first temperature and hot-pressing the fired composition at a second temperature significantly higher than said first temperature to eliminate any coloration problems.

4. A method as set forth in claim 3, further comprising adding a densification aid, containing by weight of the composition, 5% yttrium oxide and 2% alumina.

5. A method as set forth in claim 4 further comprising air-firing the composition at 550° C. for 3 hours prior to hot-pressing.

6. A method as set forth in claim 5 further comprising hot-pressing the composition in a nitrogen atmosphere at a temperature of approximately 1720° C. and a pressure of approximately 4.0 kpsi for at least 2 hours.

* * * * *